United States Patent [19]

Whelan

[11] 4,158,631

[45] Jun. 19, 1979

[54] PAINT STRAINER

[75] Inventor: James P. Whelan, North Marshfield, Mass.

[73] Assignee: Ad-Tec Products, Inc., Plymouth, Mass.

[21] Appl. No.: 898,183

[22] Filed: Apr. 20, 1978

Related U.S. Application Data

[63] Continuation of Ser. No. 770,077, Feb. 18, 1977, abandoned.

[51] Int. Cl.[2] .............................................. B01J 23/28

[52] U.S. Cl. ................................................ 210/497 R

[58] Field of Search ............. 210/497 FB, 497 R, 474, 210/447, 483, 489, 237, 238, 470, 477; 229/1.5 B; 55/521; 156/265, 514; D44/29 K

[56] References Cited

U.S. PATENT DOCUMENTS

| | | | |
|---|---|---|---|
| 752,019 | 2/1904 | Adwen | 210/497 FB |
| 3,567,033 | 3/1971 | Whelan | 210/497 FB |
| 3,741,397 | 6/1973 | Gerson et al. | 210/497 FB |
| 4,064,053 | 12/1977 | Gerson et al. | 210/497 FB |

*Primary Examiner*—Frank Sever

*Attorney, Agent, or Firm*—Dike, Bronstein, Roberts, Cushman & Pfund

[57] ABSTRACT

A paint filter comprising a conical wall structure of sheet material embodying top and bottom portions and intermediate the top and bottom portions diametrically disposed wall openings covered with a foramenous webbing and intermediate the wall openings wall portions which connect the top and bottom portions of the structure characterized in that one of the wall portions of the structure intermediate the wall openings contains a secondary opening also covered with said foramenous webbing which is located substantially at the apex of the bottom portion.

1 Claim, 18 Drawing Figures

PAINT STRAINER

This is a continuation of application Ser. No. 770,077, filed Feb. 18, 1977, now abandoned.

BACKGROUND OF THE INVENTION

In my U.S. Pat. No. 3,567,033, there is shown a paint strainer in the form of a cone containing diametrically disposed wall openings covered with a foramenous material wherein that portion of the structure below the wall openings is imperforate and so constitutes a small internal well-shaped pocket which prevents complete draining of the paint from the receptacle and while the amount retained in this pocket is not very large, it does represent, over a period of time, a relatively large quantity of paint. Moreover, this pocket tends to collect the heavier particles in the paint and to thus noticeably discolor a fresh batch of paint poured into the strainer. In order to eliminate this pocket, one manufacturer of paint strainers truncated the lower end of the wall structure and formed the foramenous material into a conical point so that the paint would drain completely from the lower end of the filter. However, problems were encountered with this structure due to the fact that it was impossible to seal the foramenous material at the apex without applying so much adhesive that it rendered the tip nonporous and proved to be a problem when packaging because the adhesive-saturated tips tended to stick to each other so that it became difficult to separate them without pulling the seams open. If a lesser amount of adhesive was used, the edges would not adhere and would open up, allowing the paint to stream freely through. Additionally, when packaged in shipping containers, the weight of the containers mashed the pointed ends of the strainers, breaking the foramenous material away from the tip and away from the wall structure. The purpose of this invention is to provide a strainer with the advantage of substantially complete drainage of the paint without truncating the tip, thereby to avoid the difficulties inherent in a truncated structure such as referred to above and, in addition, to provide for an optimum filling rate and maximum strength for shipping, handling and the like.

SUMMARY OF THE INVENTION

A paint filter comprising a conical wall structure of relatively stiff imperforate sheet material embodying top and bottom portions and intermediate the top and bottom portions diametrically disposed wall openings covered with a foramenous material and intermediate the wall openings, wall portions connecting the top and bottom portions characterized in that one of the wall portions contains a secondary opening symmetrically located with respect to the wall openings, the lower edge of which is situated substantially at the apex of the bottom and that said foramenous material covers said secondary opening. The secondary opening may be of teardrop configuration with its apex located below the level of the upper edges of the wall openings and its lower arcuate edge substantially at the apex of the lower portion or of elongate oval configuration with its upper edge substantially at the level of the upper edges of the wall openings and its lower edge substantially at the apex of the lower portion or of generally triangular configuration with its apex at the level of the upper edges of the wall openings and its lower edge substantially at the apex of the lower portion.

The invention will now be described in greater detail with reference to the accompanying drawings, wherein.

Figure 2:
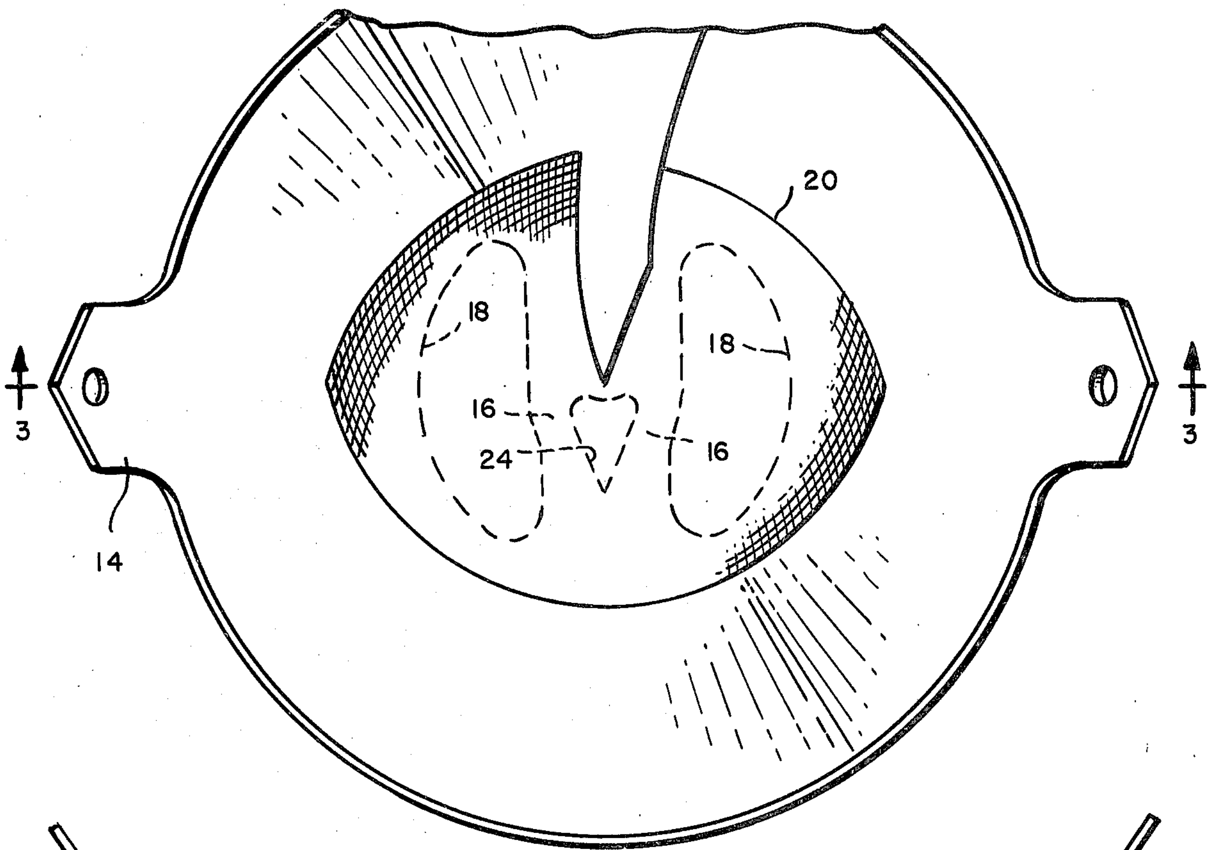
FIG. 2 is a top view of FIG. 1.
Figure 1:
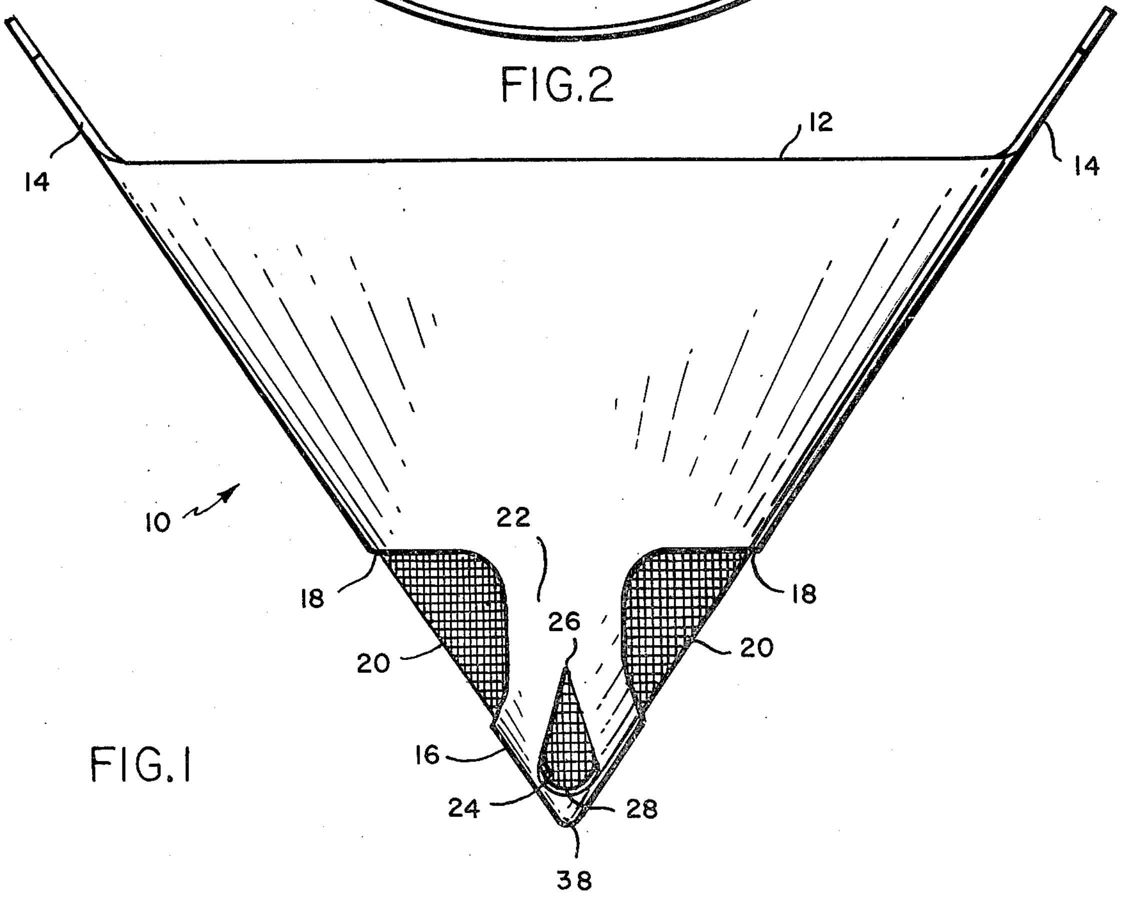
FIG. 1 is a front elevation of the paint strainer in one form.
Figure 3:
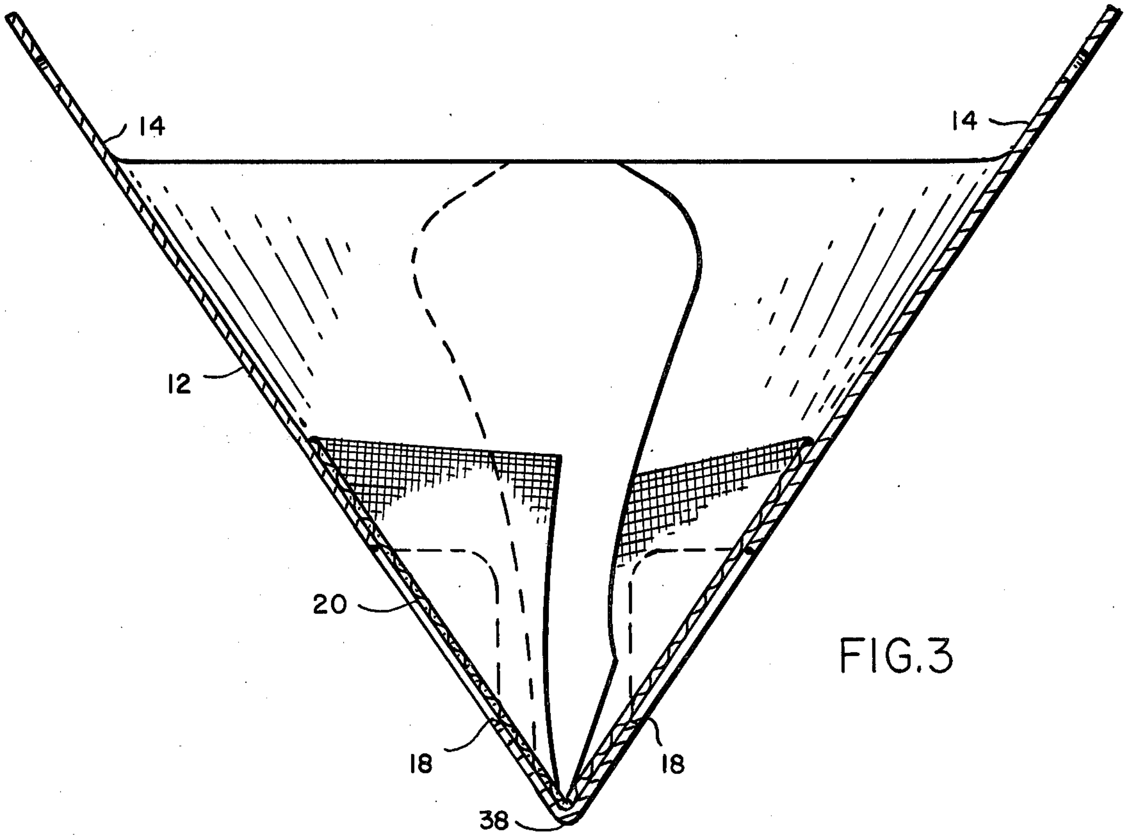
FIG. 3 is a vertical section taken on the line 3—3 of FIG. 2.
Figure 4:
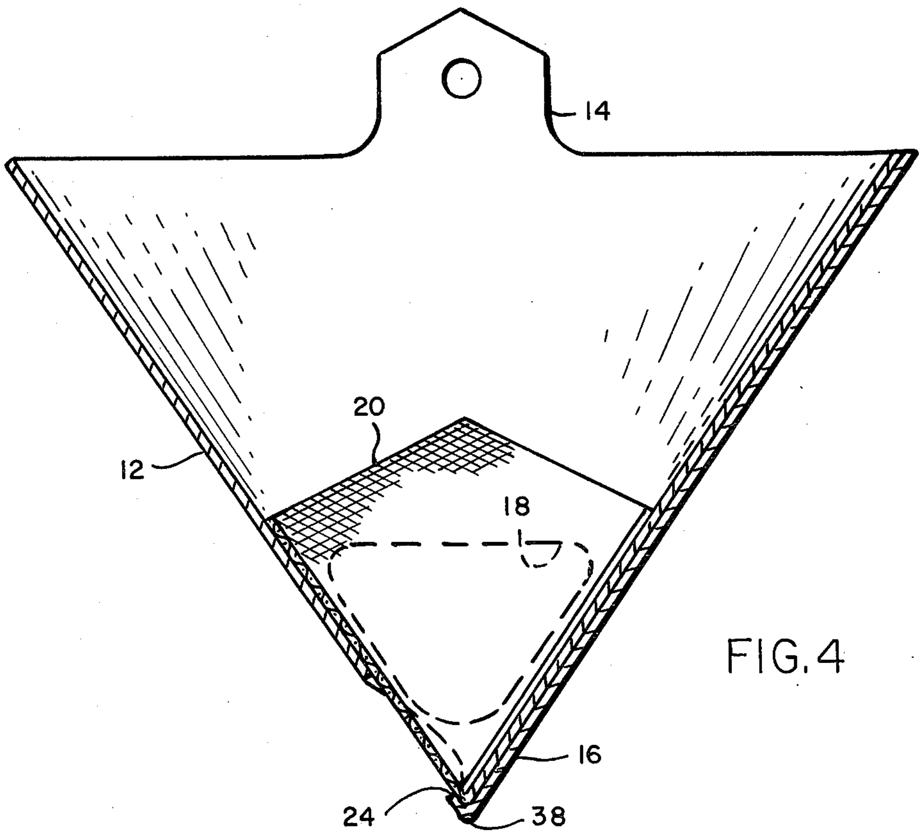
FIG. 4 is a diametrical section taken at right angles to FIG. 3.

Referring to the drawings, FIGS. 1 to 5 inclusive, the paint strainer in one form comprises a conical structure 10 of relatively stiff sheet material, for example, paperboard comprising an upper part 12 open at the top and at the opposite sides of which are diametrically disposed perforated ears 14—14 and a lower part 16 having a closed bottom. Between the upper and lower parts, there are diametrically disposed wall openings 18—18 covered with a foramenous material 20 and intermediate the wall openings wall portions 22—22 comprised of the imperforate material of the wall structure which connect the upper and lower parts to each other. In accordance with the invention, one of the wall portions 22 contains a secondary opening 24, FIG. 1, also covered with the foramenous material, the secondary opening 24 being somewhat teardrop in configuration and located symmetrically within the wall portion with respect to the wall openings 18—18 with its apex intermediate the upper and lower edges of the wall openings 18—18 and its lower curved edge 28 situated in the tip of the cone. As will be seen by reference to FIG. 4, the secondary opening 24 is so close to the closed bottom of the lower part 16 that any paint which does not filter out through the wall openings 18—18 will filter out through the secondary opening 24 so that substantially no paint will be left at the inner side of the tip at the bottom of the cone.

Figure 5:
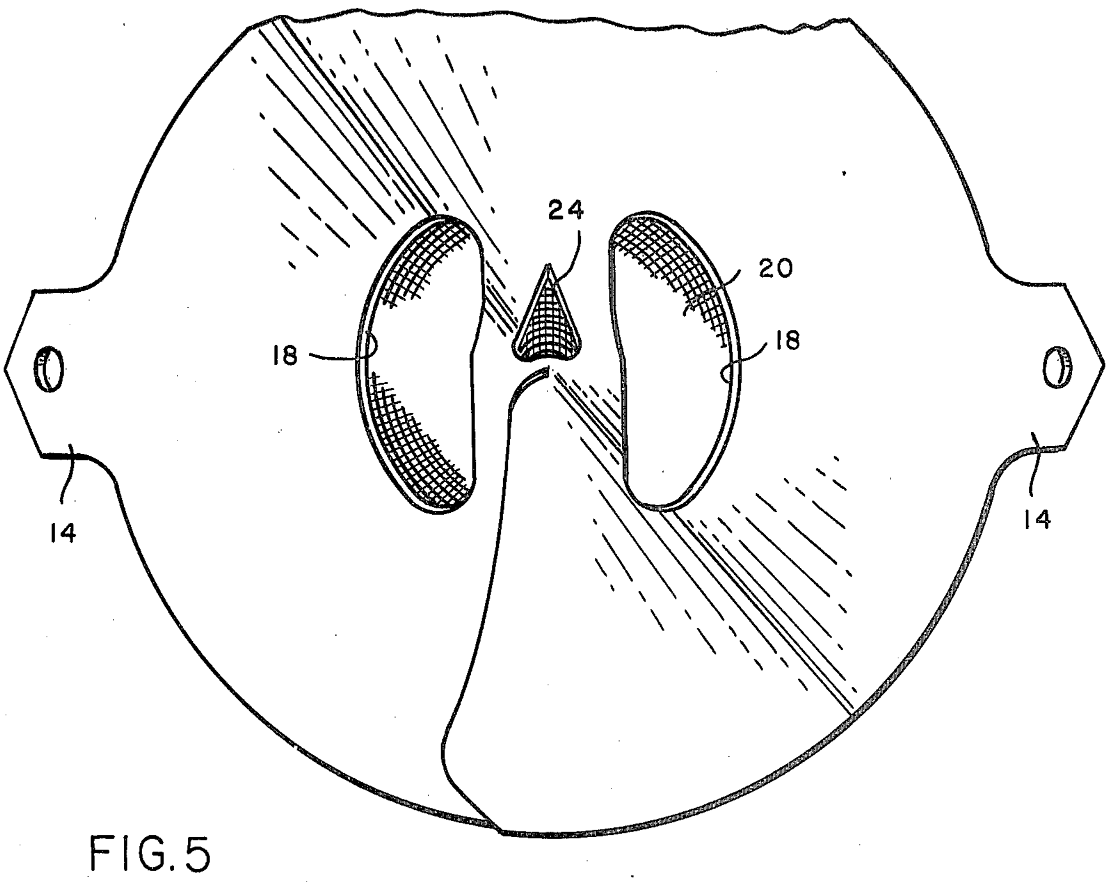
FIG. 5 is a bottom view of FIG. 1.
Figure 6:
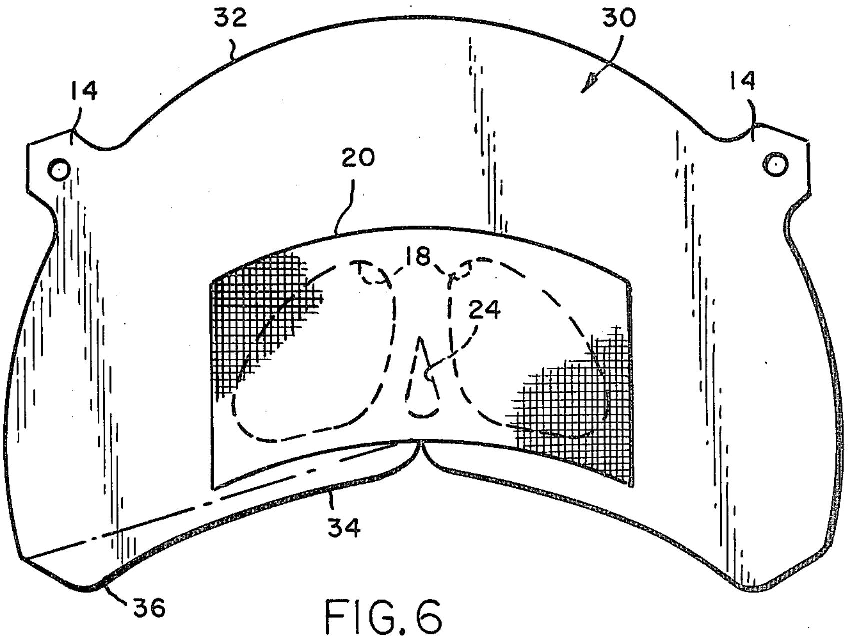
FIG. 6 is a plan view of the blank from which the structure shown in FIG. 1 is comprised.

The conical strainer as shown in FIGS. 1 to 5 inclusive is made up of a blank 30, FIG. 6, die-cut from sheet material so as to have upper and lower arcuate edges 32, 34 from which project the perforated ears 14—14, the wall openings 18—18 and secondary opening 24. The foramenous material 20 is die-cut and applied to the flat blank 30 over the openings 18—18 and 24, whereupon the blank is folded to form the cone with one of the ends overlapping the other and secured. Preferably, as shown in my U.S. Pat. No. 3,567,033, one or both ends is provided with an extension 36 of somewhat bulbular configuration so as to provide a relatively wide tab for securing the ends of the blank together.

FIG. 2 shows the inside of the paint strainer with the foramenous material covering the openings at the bottom part of the paint strainer and FIG. 5 shows the outer side of the paint strainer and, in particular, shows that only one of the portions 22 connecting the upper and lower parts contains the secondary opening. The sections shown in FIGS. 3 and 4 which are, respectively, diametrically through the ears of the strainer and at right angles thereto illustrate in particular that the foramenous material is supported at the closed bottom of the strainer by the rigid material at the tip 38 which is an integral continuation of the imperforate material of the portion 22 at the side opposite the secondary opening 24, but is sufficiently abbreviated so that the lower edge of the secondary opening 24 is substantially at the bottom of the inside lower extremity of the tip at the bottom of the strainer.

An alternate structure is shown in FIG. 7 to 11 inclusive. In this form, the paint strainer 40 comprises an upper part 42 open at the top provided with diametrically disposed perforated ears 44—44 and a lower part 46 closed at the bottom. Intermediate the top and bottom parts, there are wall openings 48—48 covered with a foramenous material 50 and wall portions 52—52 connecting the upper and lower parts 42 and 46. One of the wall portions 52 contains a secondary opening 54 which is of generally elongate oval configuration, the upper end 56 of which is substantially at the level of the upper edges of the wall openings 48—48 and the lower edge 58 of which is below the lower edges of the wall openings and substantially at the tip of the strainer. The other wall portion 52 is imperforate, being comprised of the imperforate material of the structure. As will be seen by reference to FIG. 10, the secondary opening 54 extends down to the top of the bottom part so that paint which is not completely strained through the wall openings will continue to strain through the secondary opening until substantially no paint is left at the bottom of the strainer. The tip 60 is an integral continuation of the imperforate wall portion 52 at the side of the secondary opening and so affords rigidity at the lower end of the strainer which prevents distortion.

Figure 12:
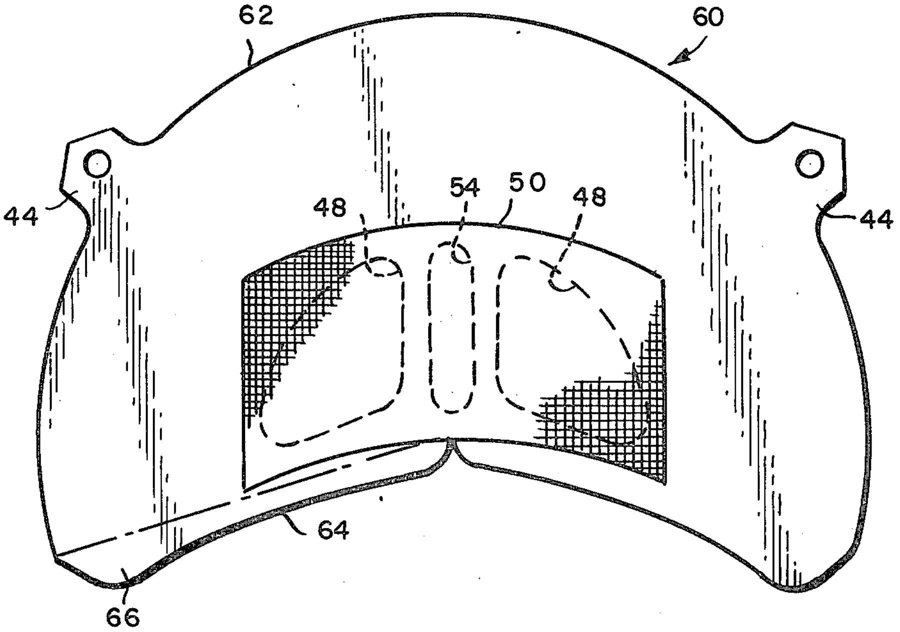
FIG. 12 is a plan view of the blank from which the structure shown in FIG. 7 is made.

The paint strainer as shown in these figures is comprised of a blank 61, FIG. 12, of sheet material die-cut to provide upper and lower arcuate edges 62 and 64, the ears 44—44 and the openings 48—48 and 54. The foramenous material 50 is adhesively secured to the inner side of the blank over the openings 48—48 and 54, whereupon the blank is formed to the shape of a cone and its ends secured by the lapping of one end over the other and, for this purpose, one or both ends is provided with an extension 66 to increase the strength of the seam where the parts are adhesively secured in engagement with each other.

Figure 8:
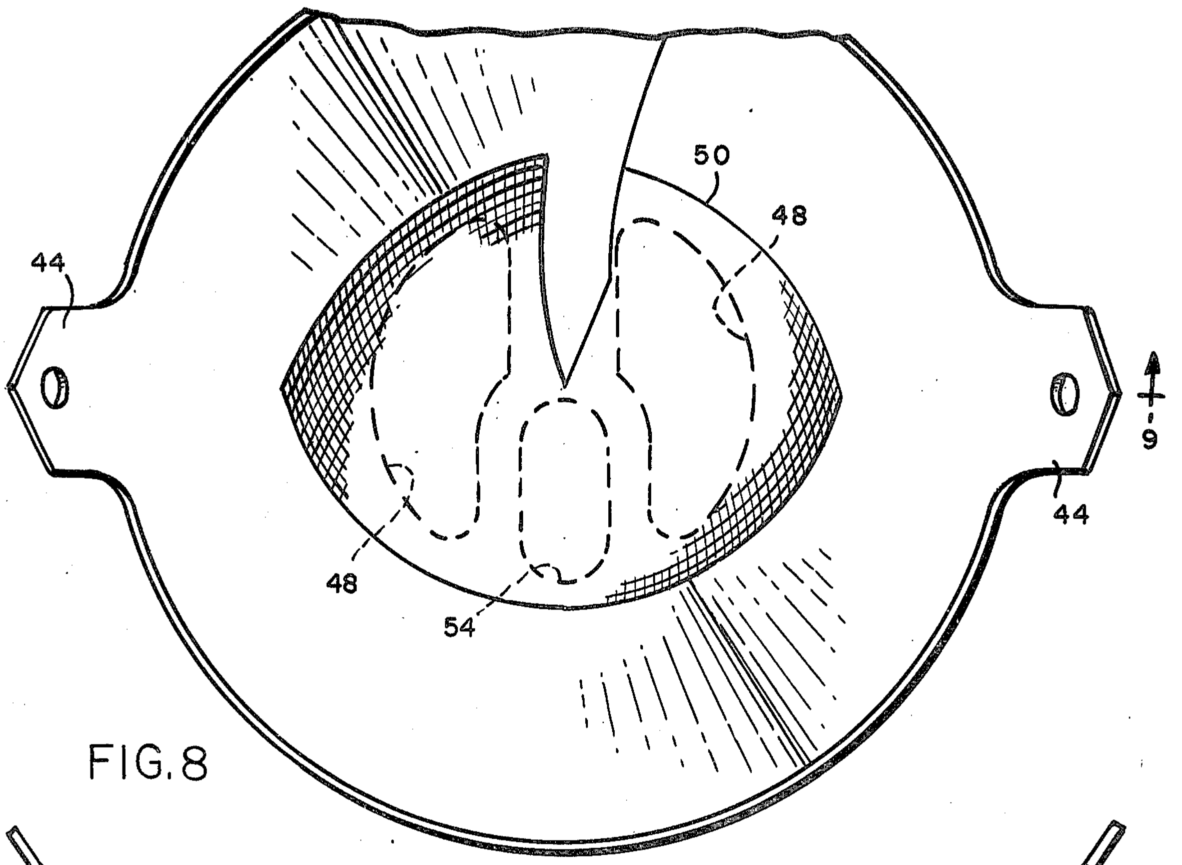
FIG. 8 is a top view of FIG. 7.
Figure 7:
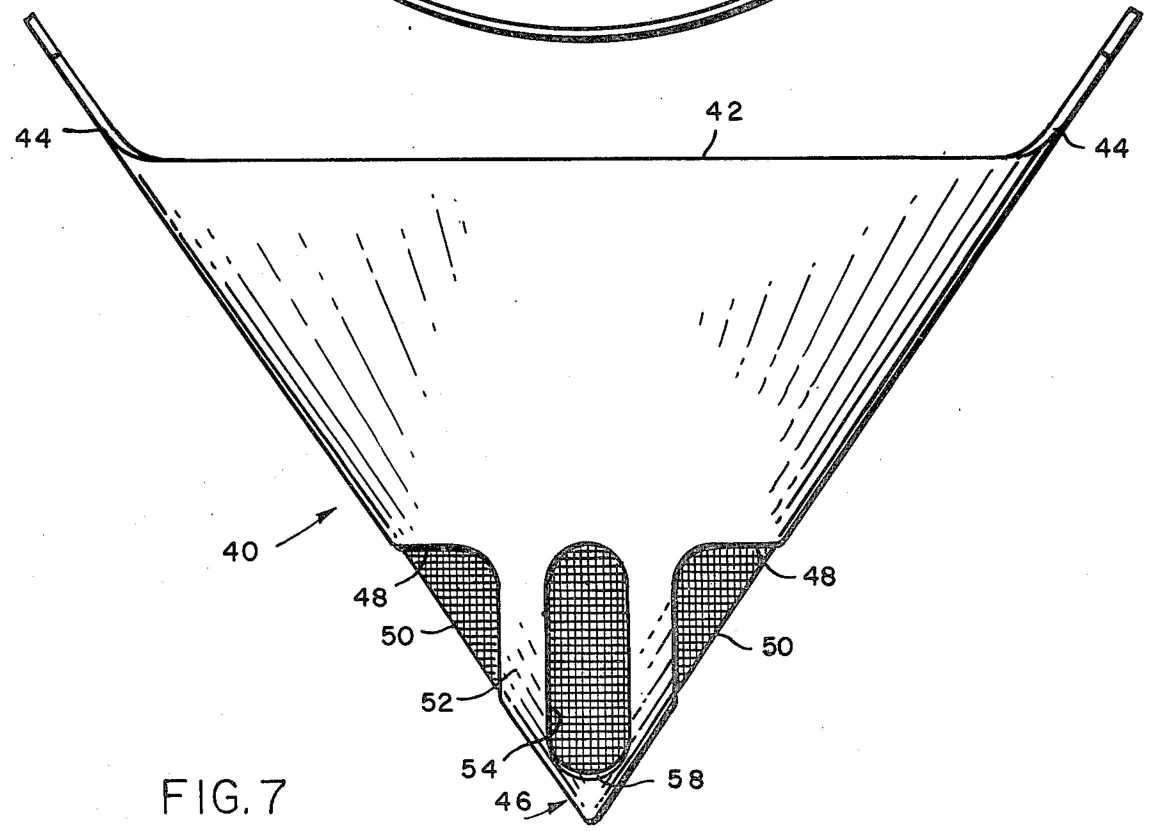
FIG. 7 is an elevation of an alternative form of the structure.
Figure 9:
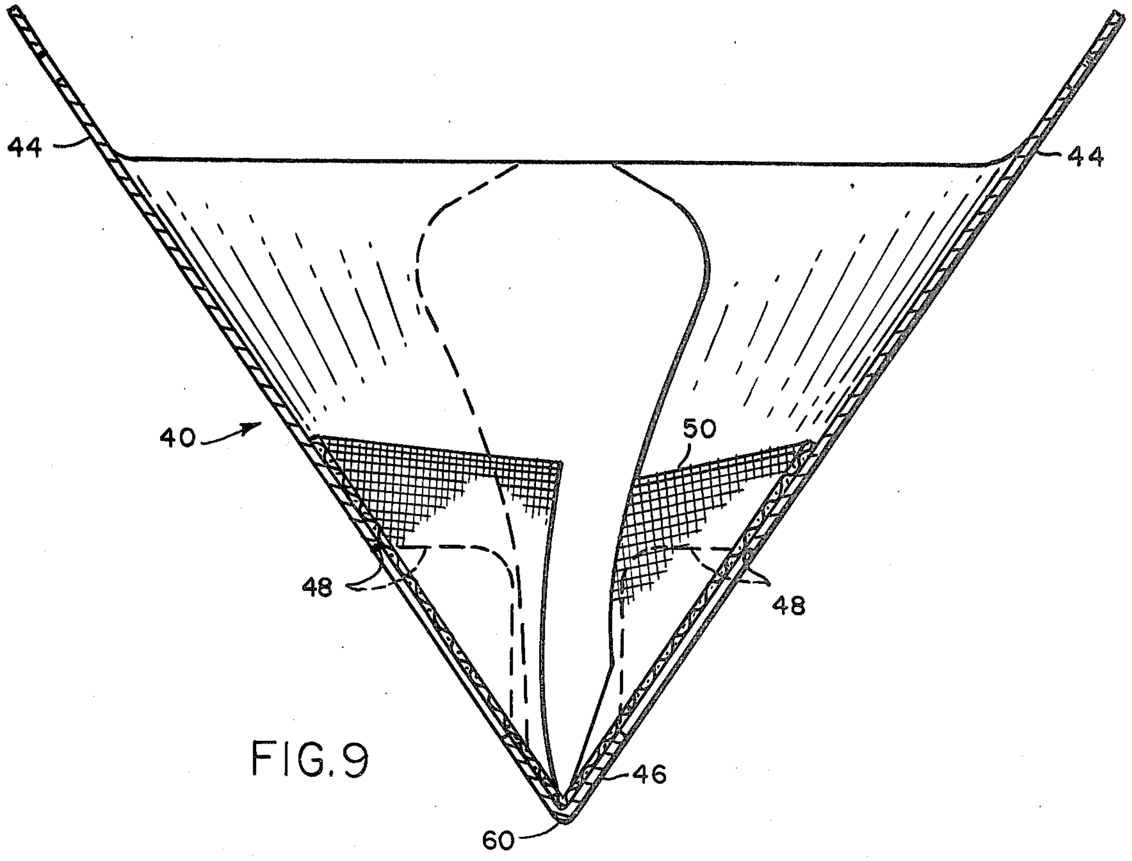
FIG. 9 is a diametral section taken on the line 9—9 of FIG. 8.
Figure 10:
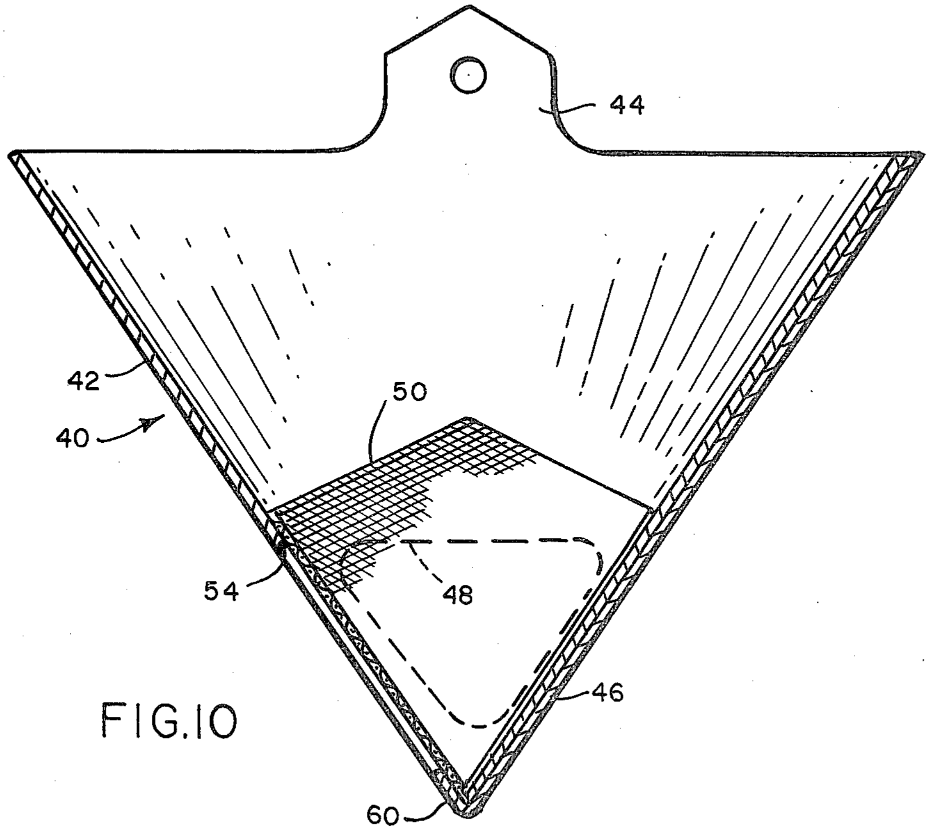
FIG. 10 is a diametral section taken at right angles to that of FIG. 9.
Figure 11:
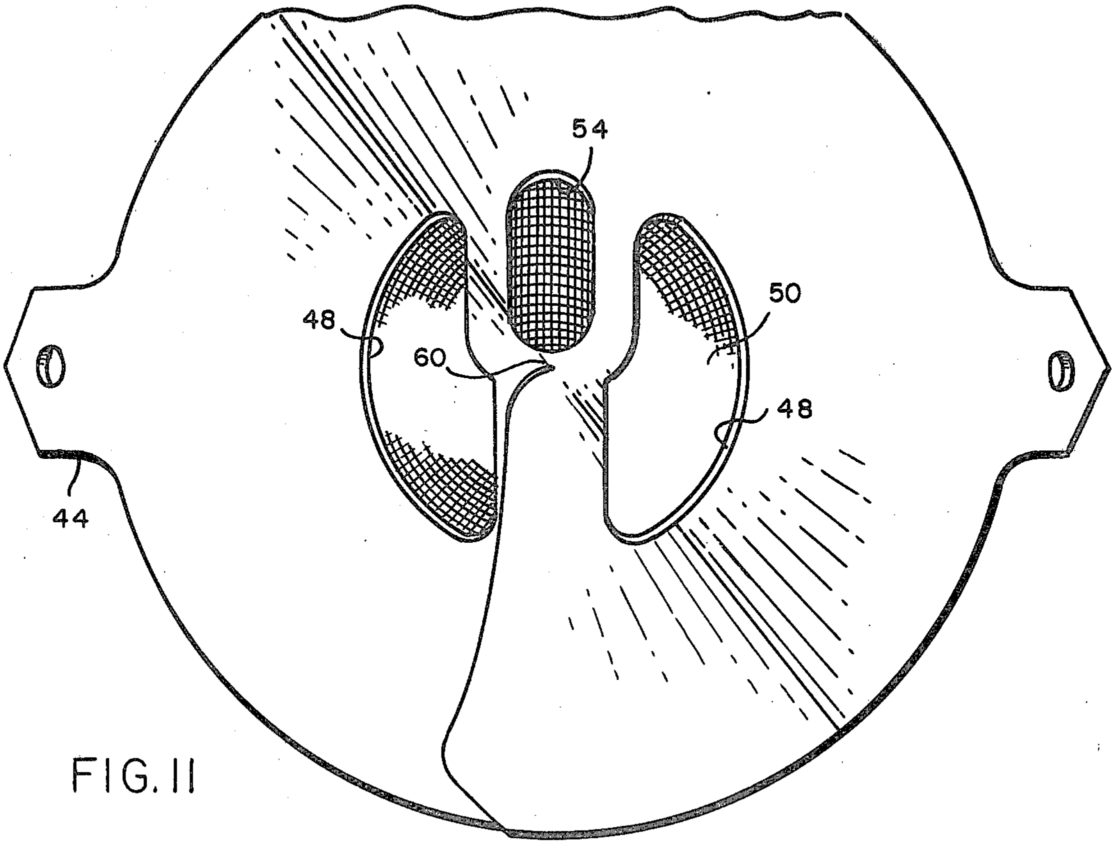
FIG. 11 is a bottom view of FIG. 7.

FIG. 8 shows the inside of the strainer as thus formed and FIG. 11 the outside.

A third form of the structure is shown in FIGS. 13 to 17 inclusive. In this form, the paint strainer 70 comprises an upper part 72 open at the top, at the opposite sides of which are perforate ears 74—74 and a lower part 76 which is closed at the bottom. Intermediate the upper and lower parts, there are wall openings 78—78 covered with foramenous sheet material 80 and wall portions 82—82 which connect the lower part to the upper part. One of the wall portions 82 contains a secondary opening 84 and this is also covered with the foramenous material 80. The secondary opening 84 is somewhat triangular in configuration, having an upper apex edge 86 which is substantially at the level of the upper edges of the wall opening 78—78 and a lower or base edge 88 which is closely adjacent the bottom. As constructed, the lower edge 88 of the secondary opening extends around the lower part of the portions 82 within which it is located at the one side into the wall portion at the other side, thus providing for a very extensive area for draining the last vestige of paint from the bottom of the strainer. The apex 90 at the lower end of the bottom part, in spite of the extensiveness of the lower edge of the secondary opening, provides a stiff support for the lower end of the structure.

Figure 17:
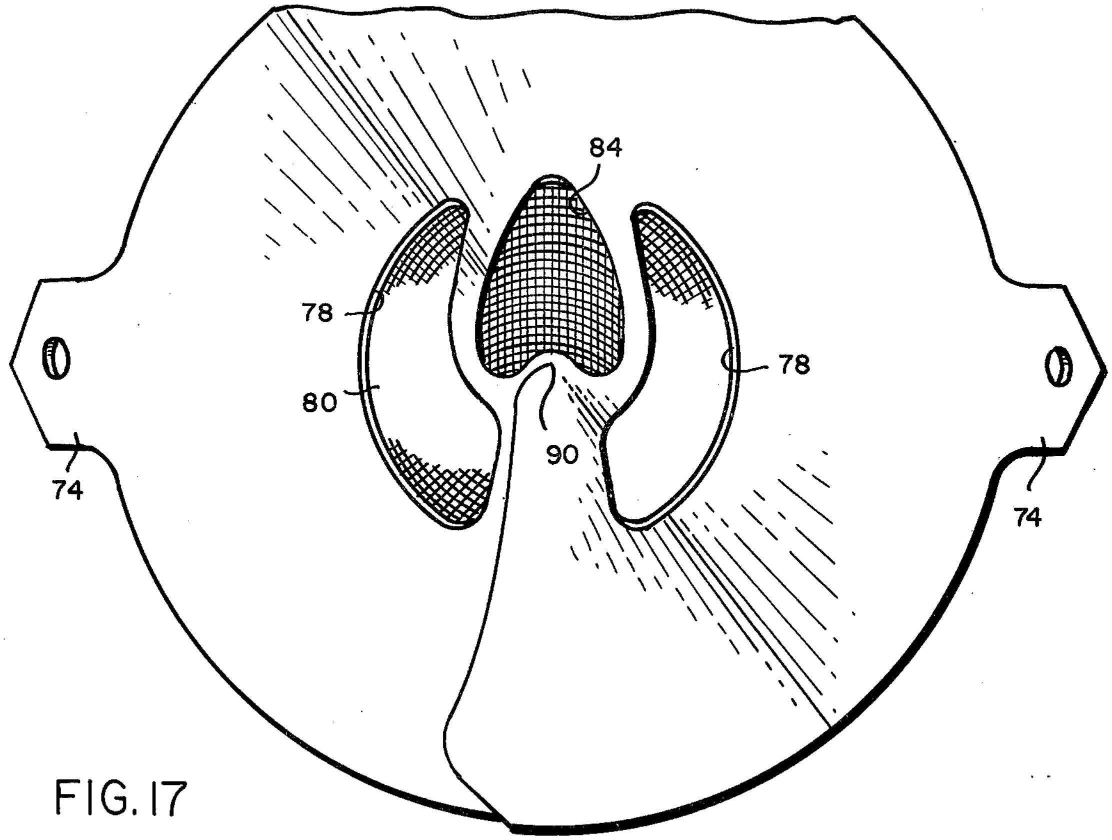
FIG. 17 is a bottom view of FIG. 13.
Figure 18:
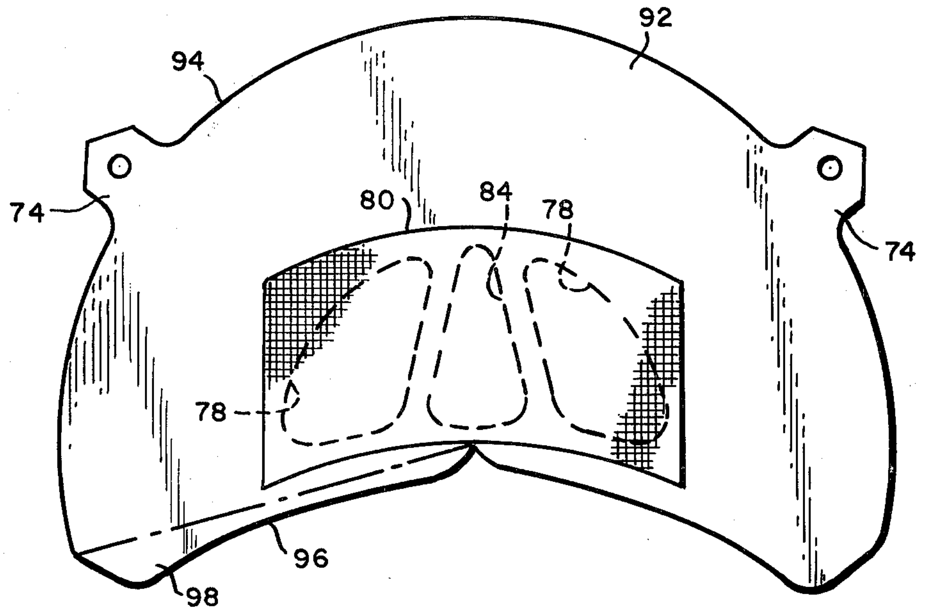
FIG. 18 is a plan view of the blank from which the container shown in FIG. 13 is made.

The paint strainer shown in FIGS. 13 to 17 is comprised of a blank 92, FIG. 18, die-cut from flat sheet material with arcuate upper and lower edges 94 and 96, with the ears 74—74 and with the wall openings 78—78 and secondary opening 84. The foramenous material 80 is glued to the inner side of the blank over the aforesaid openings whereupon the blank is formed to the shape of the cone and its ends adhesively secured and, for this purpose, one or both ends are provided with an extension 98 so as to provide a good seam.

Figure 14:
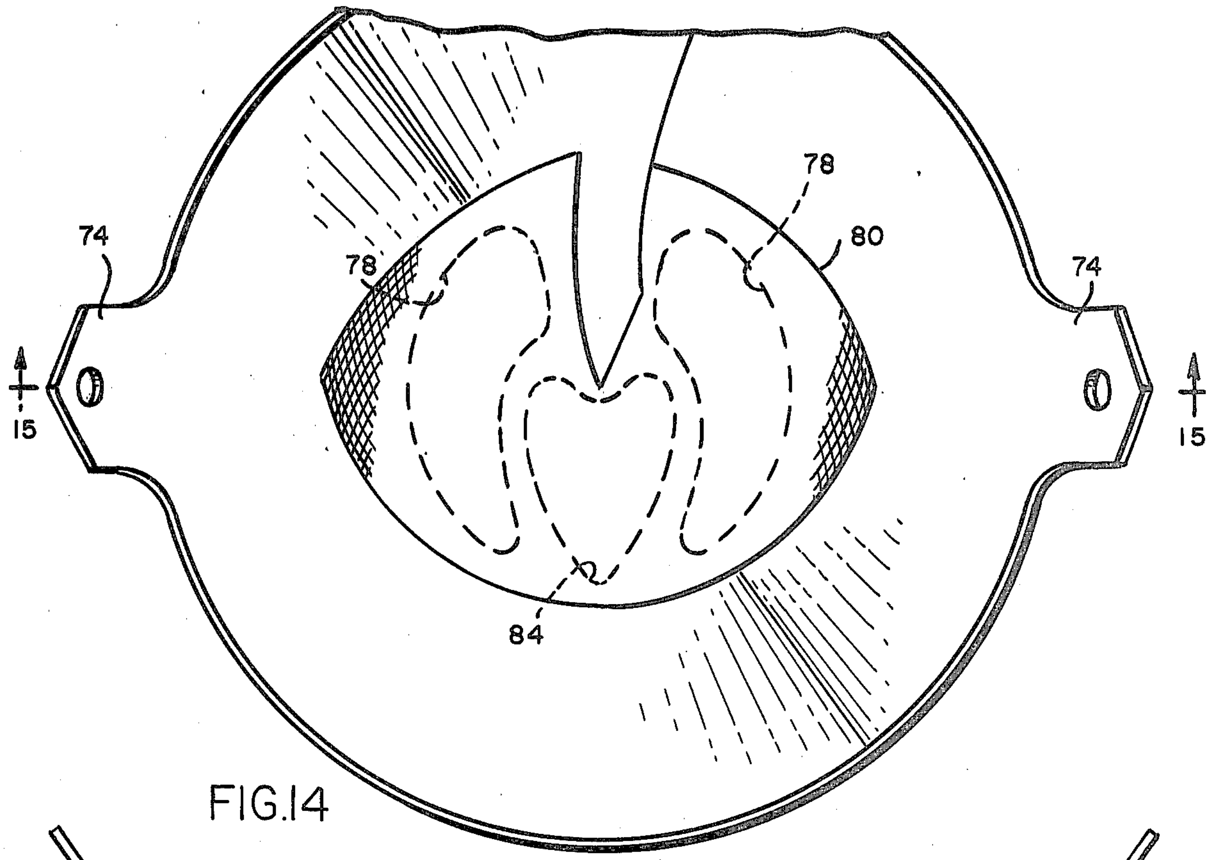
FIG. 14 is a top view of FIG. 13.
Figure 13:
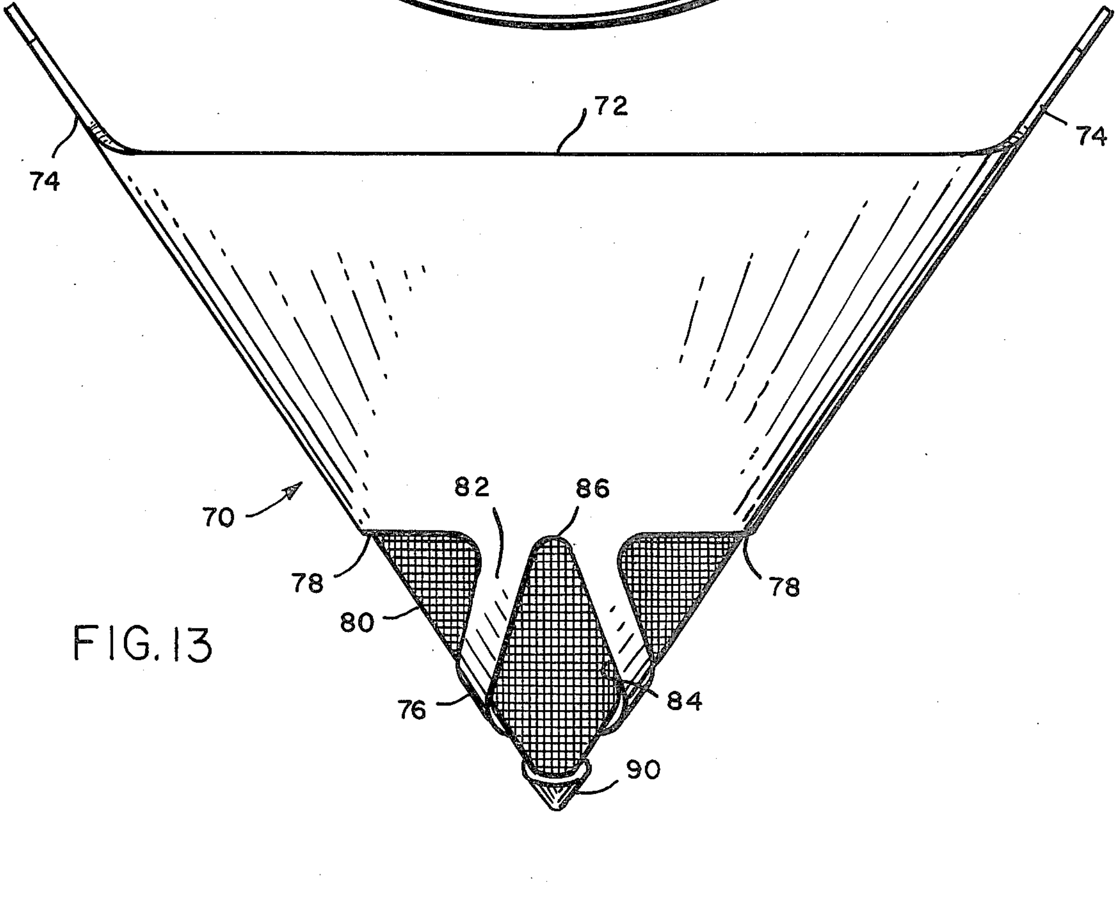
FIG. 13 is an elevation of a second alternative form of the structure.
Figure 15:
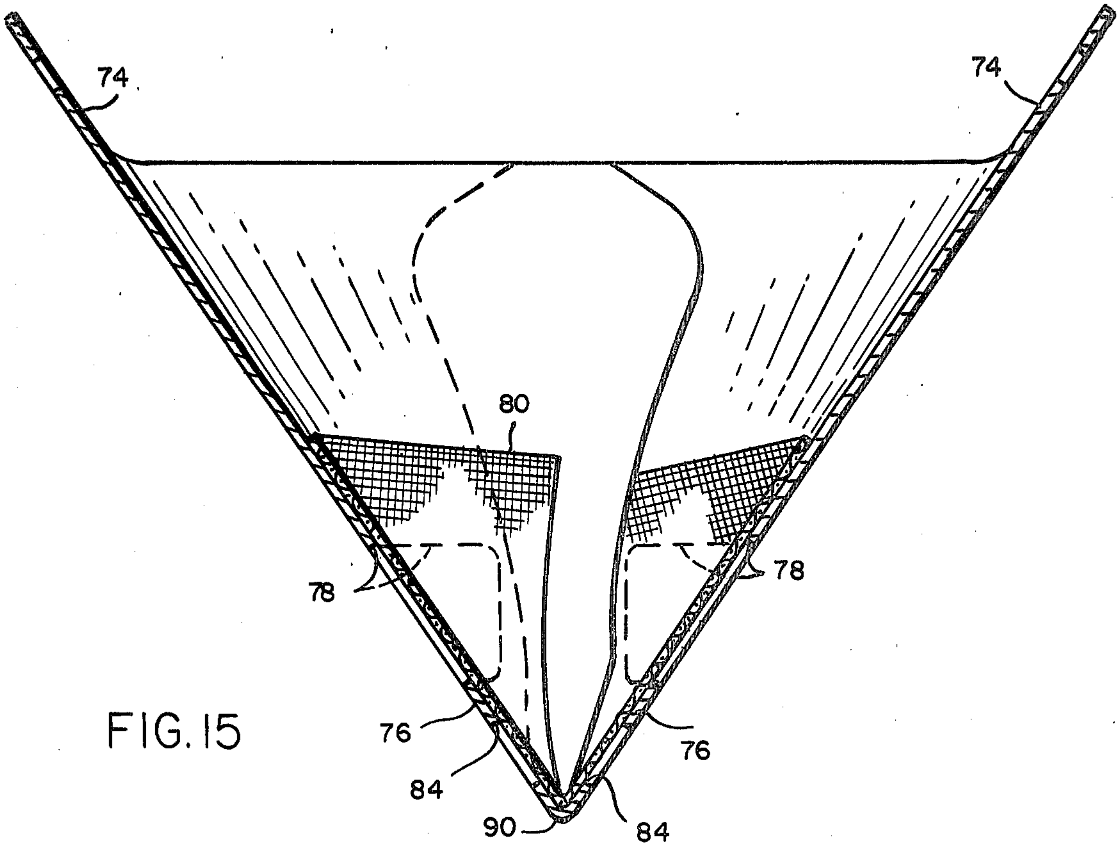
FIG. 15 is a diametral section taken on the line 15—15 of FIG. 14.
Figure 16:
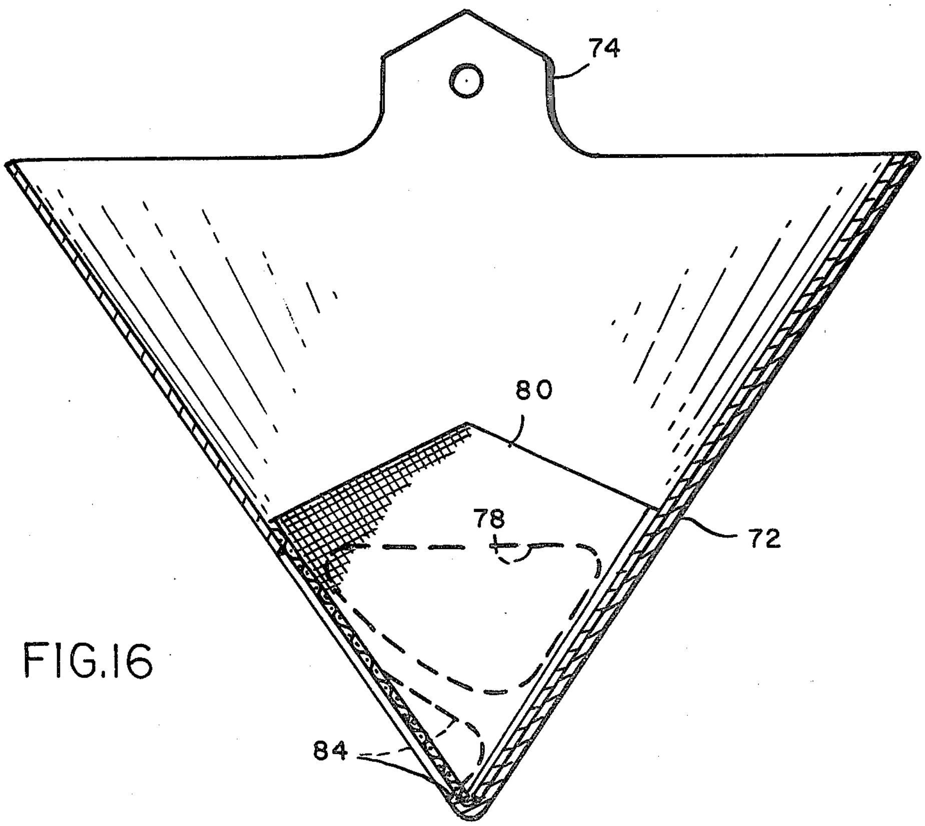
FIG. 16 is a diametral section taken at right angles to that shown in FIG. 15.

FIG. 14 shows the inside of the paint strainer and FIG. 17 the outside.

Each of the paint strainers disclosed in the several figures is characterized by the fact that, in addition to the side openings for straining paint there is provided a secondary opening so located as to insure complete draining of the paint all the way to the apex or tip of the inside of the conical bottom while, at the same time, so constructed as to afford a rigid support for the foramenous material covering the secondary opening and to insure against damaging at the point by the fact that, at the apex, a portion of the extremity of the conical structure is preserved.

The paint strainer as constructed and described provides for rapid and effective straining of the paint in contrast to paint strainers which do not have the secondary opening as disclosed herein and, in addition, insures complete drainage by the elimination of any substantial pocket at the bottom of the paint strainer and, hence, the elimination of any residue at the bottom of the paint strainer in the form of sediment or other solid particles which could cause discoloration.

While the paint strainer as disclosed in its various forms is preferably made of a relatively stiff paperboard, it could also be made of other sheet material such as some of the man-made materials which are resistant to solvents and/or water.

It should be understood that the present disclosure is for the purpose of illustration only and includes all modifications or improvements which fall within the scope of the appended claims.

I claim:

1. A paint strainer comprising a conical receptacle having a conically tapering side wall defining a conical interior chamber, said receptacle consisting of relatively stiff sheet material and comprising top, intermediate and bottom parts, said intermediate part containing diametral openings between which there are diametral wall portions of lesser peripheral width than the openings, the wall portions being integral with and connecting the top and bottom portions and being of sufficient strength in tension and stiffness in compression to prevent separation of the bottom part from the top part due to the weight of the paint and displacement of the bottom part upwardly into the top part from external pressure applied to the tip, and diametral openings in the intermediate part comprising discharge openings and said bottom part containing means consisting of a drainage opening of smaller area than the discharge openings situated in the wall of said bottom part with the lowest portion thereof at the level of the bottom of the interior chamber, but above the tip at the exterior such as to enable complete drainage of the receptacle and said bottom part below the opening being imperforate peripherally and means constituting a rigid, crush-resistant tip and a flexible, fine mesh screen material adhered to the inside of the chamber covering the discharge and drainage openings.

* * * * *